(12) United States Patent
Sheridan et al.

(10) Patent No.: US 9,732,629 B2
(45) Date of Patent: Aug. 15, 2017

(54) TURBOFAN ENGINE MAIN BEARING ARRANGEMENT

(71) Applicant: United Technologies Corporation, Hartford, CT (US)

(72) Inventors: William G. Sheridan, Southington, CT (US); Frederick M. Schwarz, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 751 days.

(21) Appl. No.: 14/207,722

(22) Filed: Mar. 13, 2014

(65) Prior Publication Data

US 2015/0125293 A1    May 7, 2015

Related U.S. Application Data

(60) Provisional application No. 61/789,266, filed on Mar. 15, 2013.

(51) Int. Cl.
| | |
|---|---|
| *F02C 7/06* | (2006.01) |
| *F01D 25/16* | (2006.01) |
| *F02C 7/36* | (2006.01) |
| *F02C 3/107* | (2006.01) |
| *F01D 5/02* | (2006.01) |

(52) U.S. Cl.
CPC .............. *F01D 25/16* (2013.01); *F01D 5/02* (2013.01); *F01D 25/162* (2013.01); *F02C 3/107* (2013.01); *F02C 7/06* (2013.01); *F02C 7/36* (2013.01); *F05D 2220/36* (2013.01); *F05D 2240/24* (2013.01); *F05D 2240/52* (2013.01); *F05D 2240/54* (2013.01); *F05D 2260/40311* (2013.01)

(58) Field of Classification Search
CPC .......... F01D 25/16; F01D 25/162; F01D 5/02; F02C 7/06; F02C 7/36
See application file for complete search history.

(56) References Cited

U.S. PATENT DOCUMENTS

| | | | |
|---|---|---|---|
| 3,903,690 A * | 9/1975 | Jones ...................... | F02C 3/067 |
| | | | 184/6.11 |
| 5,433,674 A | 7/1995 | Sheridan et al. | |
| 6,464,401 B1 | 10/2002 | Allard | |
| 7,412,819 B2 * | 8/2008 | Bart ....................... | F01D 25/162 |
| | | | 415/144 |
| 7,694,505 B2 | 4/2010 | Schilling | |
| 7,882,693 B2 * | 2/2011 | Schilling ................. | F02C 3/107 |
| | | | 60/204 |

(Continued)

OTHER PUBLICATIONS

International Search Report and Written Opinion for PCT/US2014/025164, dated Jun. 24, 2014.

*Primary Examiner* — Woody Lee, Jr.
(74) *Attorney, Agent, or Firm* — Bachman & LaPointe, P.C.

(57) ABSTRACT

A turbofan engine (20; 300; 400) comprises a fan (28), a fan drive gear system (60), a fan shaft (120) coupling the fan drive gear system to the fan, a low spool, an intermediate spool, and a core spool. The low spool engages at least three main bearings of which at least two are non-thrust bearings and at least one is a thrust bearing. The fan shaft engages at least two bearings (148, 150). The core spool engages at least two bearings (250, 260). The intermediate spool engages at least two of said bearings (220, 200, 230; 220, 200, 230-2; 200, 220, 230-3).

20 Claims, 3 Drawing Sheets

(56) References Cited

U.S. PATENT DOCUMENTS

| | | | |
|---|---|---|---|
| 2006/0130456 A1* | 6/2006 | Suciu | F01D 5/066 60/226.1 |
| 2006/0201160 A1* | 9/2006 | Richards | F01D 25/16 60/792 |
| 2008/0098715 A1 | 5/2008 | Orlando et al. | |
| 2008/0148707 A1 | 6/2008 | Schilling | |
| 2010/0205934 A1* | 8/2010 | Gallet | F01D 1/24 60/268 |
| 2011/0123326 A1 | 5/2011 | Dibenedetto et al. | |
| 2011/0206498 A1 | 8/2011 | McCooey | |
| 2012/0251306 A1 | 10/2012 | Reinhardt et al. | |
| 2013/0025257 A1 | 1/2013 | Suciu et al. | |
| 2013/0025258 A1* | 1/2013 | Merry | F02C 7/06 60/226.1 |

* cited by examiner

TURBOFAN ENGINE MAIN BEARING ARRANGEMENT

CROSS-REFERENCE TO RELATED APPLICATION

Benefit is claimed of U.S. Patent Application Ser. No. 61/789,266, filed Mar. 15, 2013, and entitled "Turbofan Engine Main Bearing Arrangement", the disclosure of which is incorporated by reference herein in its entirety as if set forth at length.

BACKGROUND

The disclosure relates to turbofan engines. More particularly, the disclosure relates to main bearing arrangements for turbofan engines having epicyclic gear reductions.

Gas turbine engines and similar structures feature a number of subassemblies mounted for rotation relative to a fixed case structure. Such engines have a number of main bearings reacting radial and/or thrust loads. Examples of such bearings are rolling element bearings such as ball bearings and roller bearings. Typically such bearings all react radial loads. Some such bearings also react axial (thrust) loads (either unidirectionally or bidirectionally). Ball bearings typically react thrust loads bidirectionally. However, if the inner race is configured to engage just one longitudinal side of the balls while the outer race engages the other longitudinal side, the ball bearing will react thrust unidirectionally.

Tapered roller bearings typically react thrust unidirectionally. Two oppositely-directed tapered roller bearings may be paired or "duplexed" to react thrust bidirectionally. An example is found in the fan shaft bearings of U.S. Patent Application Publication 2011/0123326A1. Such fan shaft bearings are widely spaced to behave as two distinct bearings providing radial support at two spaced locations so as to adequately react overturning moments or torques normal to the bearing axis (e.g., pitch and yaw) and thus fully support the fan. Other duplexing examples involve closely spaced bearings which behave as a single bearing and their combination may be referred to as a single duplex bearing. Such a single duplex may need to have a longitudinally spaced apart additional bearing reacting radial loads (and optionally thrust loads) for their combination to react yaw and pitch loads.

US Patent Application Publications 2013/0025257A1 and 2013/0025258A1 disclose so-called three-spool engines wherein a high pressure spool comprises a high pressure compressor (HPC) and a high pressure turbine (HPT) respectively upstream of and downstream of a combustor. An intermediate spool comprises an intermediate pressure compressor (IPC) upstream of the HPC and an intermediate pressure turbine (IPT) downstream of the HPT. A low spool comprises a low pressure turbine (LPT) downstream of the IPT and driving the fan via a fan drive gear system. The exemplary low spool comprises only the LPT and associated shaft assembly and does not include any compressor stages.

Unless explicitly or implicitly indicated otherwise, the term "bearing" designates an entire bearing system (e.g., inner race, outer race and a circumferential array of rolling elements) rather than the individual rolling elements. The term "main bearing" designates a bearing used in a gas turbine engine to support the primary rotating structures within the engine that produce thrust. This is distinguished, for example, from an accessory bearing (which is a bearing that supports rotating structures that do not produce thrust such as the fuel pump or oil pump bearings in an accessory gearbox).

SUMMARY

One aspect of the disclosure involves a turbofan engine comprising: a fan; a fan drive gear system; a fan shaft coupling the fan drive gear system to the fan. A low spool comprises a low pressure turbine and a low shaft coupling the low pressure turbine to the fan drive gear system. An intermediate spool comprises an intermediate pressure turbine and a compressor. A core spool comprises a high pressure turbine and a compressor. The low spool engages at least three main bearings of which at least two are non-thrust bearings and at least one is a thrust bearing. The fan shaft engages at least two bearings. The core spool engages at least two bearings. The intermediate spool engages at least two of said bearings.

In one or more embodiments of any of the foregoing embodiments, said non-thrust bearings and said thrust bearing are rolling element bearings.

In one or more embodiments of any of the foregoing embodiments, said thrust bearing is a non-duplex ball bearing.

In one or more embodiments of any of the foregoing embodiments, said non-thrust bearings are roller bearings and said thrust bearing is a ball bearing.

In one or more embodiments of any of the foregoing embodiments, there may be exactly nine said main bearings.

In one or more embodiments of any of the foregoing embodiments, each of said main bearings is either a single stage rolling element bearing or a multi-stage bearing wherein an interstage gap is no more than 30 mm.

In one or more embodiments of any of the foregoing embodiments, the at least two non-thrust bearings are exactly two.

In one or more embodiments of any of the foregoing embodiments, said one thrust bearing engaging the low spool also engages the intermediate shaft.

In one or more embodiments of any of the foregoing embodiments, two of the non-thrust bearings engaging the low spool also engage a case.

In one or more embodiments of any of the foregoing embodiments, of the at least two bearings that engage the fan shaft, at least one is a non-thrust bearing and at least one is a thrust bearing.

In one or more embodiments of any of the foregoing embodiments, of the at least two bearings that engage the core spool, at least one is a non-thrust bearing and at least one is a thrust bearing.

In one or more embodiments of any of the foregoing embodiments, of the at least two bearings that engage the intermediate spool, at least one is a non-thrust bearing and at least one is a thrust bearing.

In one or more embodiments of any of the foregoing embodiments, of the at least two bearings that engage the fan shaft, at least one is a non-thrust bearing and at least one is a thrust bearing.

In one or more embodiments of any of the foregoing embodiments, of the at least two bearings that engage the core spool, at least one is a non-thrust bearing and at least one is a thrust bearing.

In one or more embodiments of any of the foregoing embodiments, wherein of the at least two bearings that engage the intermediate spool, at least one is a non-thrust bearing and at least one is a thrust bearing.

In one or more embodiments of any of the foregoing embodiments, one of said at least two non-thrust bearings engaging the low spool engages a turbine exhaust frame.

In one or more embodiments of any of the foregoing embodiments, one of said at least two non-thrust bearings engaging the low spool engages an inter-turbine frame.

In one or more embodiments of any of the foregoing embodiments, the low spool engages four bearings of which at least one is a non-thrust bearing engaging the low spool and the intermediate spool.

In one or more embodiments of any of the foregoing embodiments, one of the bearings engaging the fan shaft is a thrust bearing and one the bearings engaging the fan shaft is a non-thrust bearing.

In one or more embodiments of any of the foregoing embodiments, one of the bearings engaging the core spool is a thrust bearing and one the bearings engaging the core spool is a non-thrust bearing.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
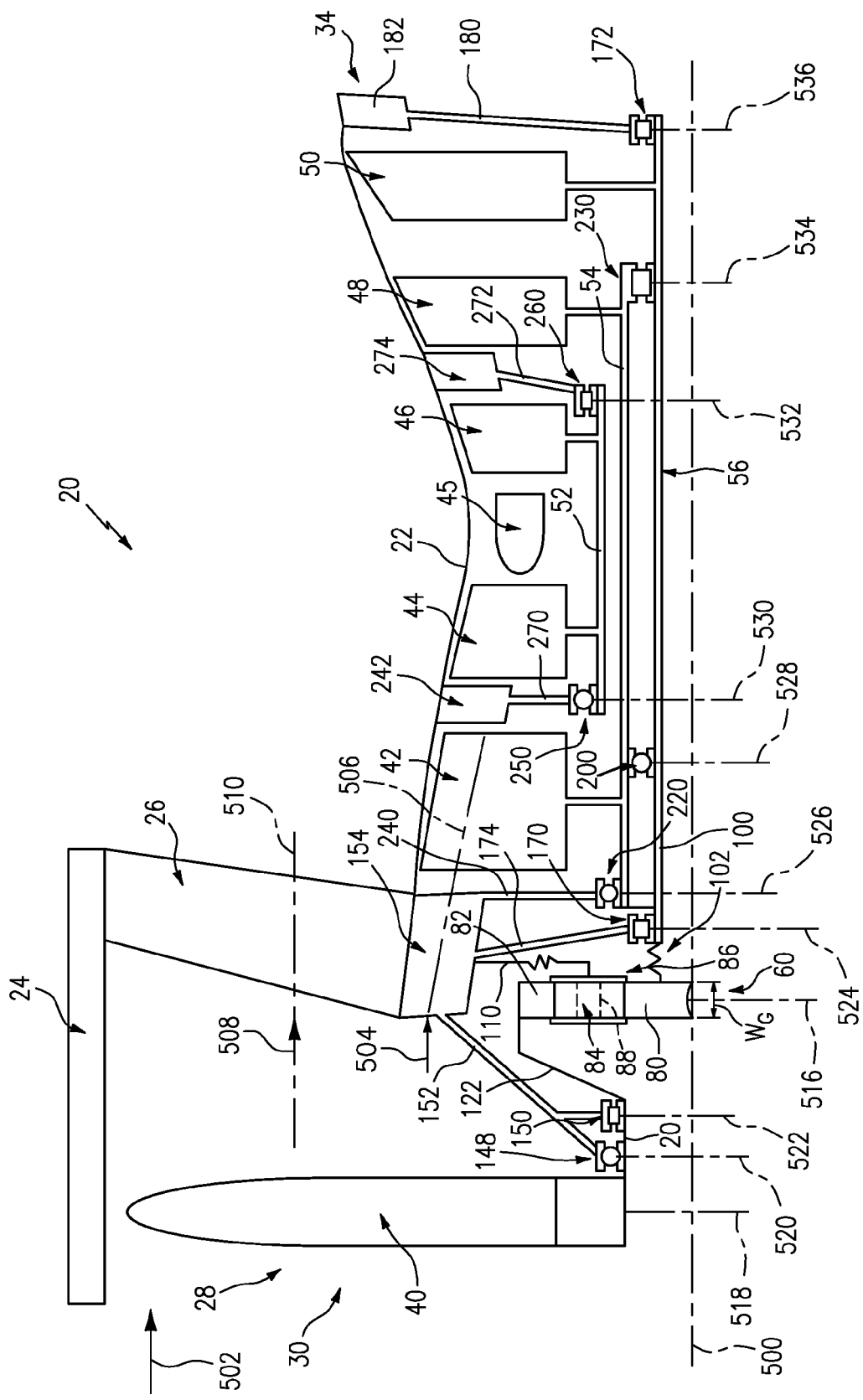
FIG. 1 is a schematic longitudinal sectional view of a first turbofan engine.

FIG. 1 shows a turbofan engine 20 having a central longitudinal axis or centerline 500. The engine has a structural case including a core case 22. The exemplary structural case further comprises a fan case 24 connected to the core case by a circumferential array of struts 26 and surrounding the fan 28. The core case and the fan case may have respective outboard aerodynamic nacelles (not shown).

The exemplary forward rim of the fan case is proximate an engine inlet 30 receiving an inlet flow 502 when the engine is operating. The inlet flow passes downstream through the fan 28 and divides into a core flow 504 passing inboard along a core flowpath 506 within the core case and a bypass flow 508 passing outboard along a bypass flowpath 510 between the core case 22 and the fan case 24.

The core flow 504 (or a major portion thereof allowing for bleeds, etc.) passes sequentially through one or more compressor sections, a combustor, and one or more turbine sections before exiting a core outlet 34. In the exemplary engine the fan is a single-stage fan having a single stage of fan blades 40. Each of the compressor and turbine sections may include one or more blade stages mounted to rotate as a unit about the centerline 500. The blade stages may be alternatingly interspersed with vane stages. Each compressor section is co-spooled with an associated turbine section. From upstream to downstream along the core flowpath, the exemplary engine has two compressor sections 42 and 44, the combustor 45, and three turbine sections 46, 48, and 50. The fan and compressor sections (and their stages) progressively compress inlet air which passes into the combustor for combustion with fuel to generate high pressure gas which passes downstream through the turbine sections where the gas pressure is progressively reduced as work is extracted. The turbine section 46 operates at highest pressure and is often referred to as a high pressure turbine (HPT) or a core turbine. The HPT blade stages are connected via a shaft 52 ("high shaft" or "core shaft") to the blade stages of the compressor section 44 to drive that compressor section (often referred to as a high pressure compressor (HPC) or core compressor) to form a high spool or core spool.

The turbine section 48 operates at an intermediate pressure range and is thus often referred to as an intermediate pressure turbine (IPT). The IPT blade stages are connected via a shaft 54 ("intermediate shaft") to the compressor section 42 to drive that compressor section (often referred to as an intermediate pressure compressor (IPC)) to form an intermediate spool.

The turbine section 50 operates at a low pressure range and is thus often referred to as a low pressure turbine (LPT). The LPT blade stages are connected via a shaft 56 ("low shaft") to a transmission 60 (e.g., an epicyclic transmission, more particularly a geared system known as a fandrive gear system (FDGS)) to indirectly drive the fan 28 with a speed reduction.

An exemplary high pressure turbine 46 is a single or double stage turbine assembly; an exemplary intermediate stage turbine 48 is a single or double stage turbine assembly; an exemplary low pressure turbine 50 is a multi-stage turbine (e.g., three or more).

The exemplary transmission 60 comprises a central externally-toothed sun gear 80. The sun gear 80 is encircled by an internally-toothed ring gear 82. A number of externally-toothed star or planet gears 84 are positioned between and enmeshed with the sun gear 80 and ring gear 82. The star or planet gears 84 can be referred to as intermediate gears. A cage or carrier assembly 86 carries the intermediate gears via associated bearings 88 for rotation about respective axes. The bearings 88 may be rolling element bearings or may be journal bearings (e.g., having external circumferential surface portions closely accommodated within internal bore surfaces of the associated intermediate gears 84).

The exemplary carrier assembly 86 comprises a front plate (e.g., annular) in front of the gears and a rear plate (e.g., annular) behind the gears. These plates may be mechanically connected by the bearings 88 and/or by linking portions between adjacent intermediate gears.

In the exemplary embodiment, a forward end of the low shaft 56 is coupled to the sun gear 80. The exemplary low shaft 56 has a generally rigid main portion 100 and a flexible forward portion 102. A forward end of the portion 102 may have a splined outer diameter (OD) surface interfitting with a splined inner diameter (ID) surface of the sun gear 80 to transmit rotation.

The exemplary carrier assembly 86 is substantially non-rotatably mounted relative to the engine case 22. In the exemplary embodiment, the carrier assembly 86 is coupled to the case 22 via a compliant flexure 110 that allows at least small temporary radial and axial excursions and rotational excursions transverse to the centerline 500.

The exemplary ring 82 is coupled to the fan 28 to rotate with the fan 28 as a unit. In the exemplary embodiment a rear hub 122 of a main fan shaft 120 connects the fan 28 to the ring gear 82.

The speed reduction ratio is determined by the ratio of diameters of the ring gear 82 to the sun gear 80. This ratio will substantially determine the maximum number of intermediate gears 84 in a given ring. The actual number of intermediate gears 84 will be determined by stability and stress/load sharing considerations. An exemplary reduction is between about 2:1 and about 13:1. Although only one intermediate gear 84 is necessary, in exemplary embodiments, the number of intermediate gears 84 may be between about three and about eleven. An exemplary gear layout with fixed carrier is found in U.S. Patent Application Publication 2012/0251306A1.

Thus, the exemplary engine 20 has four main rotating components (units) rotating about the centerline 500: the core spool (including the high pressure turbine 46, the high shaft 52, and the high pressure compressor 44); the intermediate spool (including the intermediate pressure turbine 48, the intermediate shaft 54, and the intermediate pressure compressor 42); the low spool (including the low pressure turbine 50 and low shaft 56); and the fan assembly (including the fan 28 itself and the fan shaft 120). Each of these four things needs to be supported against: radial movement; overturning rotations transverse to the centerline 500; and thrust loads (parallel to the axis 500). Radial and overturning movements are prevented by providing at least two main bearings engaging each of the four units. As is discussed below, such at least two are sufficiently axially spaced to resist the overturning movements.

Each unit would have to also engage at least one thrust bearing. The nature of thrust loads applied to each unit will differ. Accordingly, the properties of required thrust bearings may differ. For example, the fan 28 primarily experiences forward thrust and, therefore, the thrust bearings engaging the fan 28 may be configured to address forward thrust but need not necessarily address rearward thrusts of similar magnitudes, durations, etc.

The FIG. 1 embodiment has placed two main bearings 148, 150 along the fan shaft forward of the transmission 60. Inboard, the inner race of each bearing 148, 150 engages a forward portion of the shaft 120 aft of the fan 48. Outboard, the outer race of each bearing 148, 150 engages static structure of the case. The exemplary static structure comprises a support 152 extending inward and forward from a forward frame 154. These two bearings 148, 150 thus prevent radial excursions and overturning moments which the fan 48 may produce during flight.

To resist thrust loads, one or both of the bearings 148, 150 may be thrust bearings. In an exemplary embodiment, the bearing 150 is a non-thrust bearing (e.g., straight roller bearing with longitudinal roller axes configured to only handle radial loads). The other bearing (i.e., the bearing 148) is a thrust bearing. Due to the significance of forward thrust loads on the fan 28, the bearing 148 may be biased to resist forward loads. The exemplary bearing 148 is a bidirectional ball bearing or a bidirectional tapered roller bearing (e.g., wherein the rollers have a forward taper and forwardly converging roller axes to preferentially handle the forward thrust loads). A similar bidirectional tapered roller bearing is shown in U.S. Pat. No. 6,464,401 of Allard entitled "High Load Capacity Bi-Directional Tapered Roller Bearing". Ball bearings are typically bidirectional thrust bearings. However, a unidirectional ball bearing may be formed by having at least one of the races contacting only a single longitudinal side of the balls.

An exemplary bearing arrangement for supporting the remaining three units is discussed below. Various aspects of each of these may be independently implemented or all may be implemented in a given engine.

The low shaft 56 is principally radially supported by a forward bearing 170 and an aft bearing 172. The exemplary forward bearing 170 may be directly radially grounded to the case 22 (e.g., via a bearing support 174 extending inward from the frame 154 aft of the support 152).

The exemplary bearing 172 is radially grounded to the case 22 via a support 180 extending inward from a frame 182 extending across the core flowpath 504. The exemplary support 180 is aft of the LPT 50 with the frame 182 being a turbine exhaust frame. Alternative implementations may shift the support 180 forward of the LPT 50 to engage an inter-turbine frame between the turbine sections 48 and 50.

In the exemplary embodiment, both of the bearings 170 and 172 are non-thrust bearings, such as non-thrust roller bearings (e.g., is a straight roller bearing). An additional inter-shaft thrust bearing 200 (e.g., a bidirectional ball bearing) has an inner race engaging an intermediate portion of the low shaft 56 and an outer race engaging the intermediate shaft 54 to indirectly axially ground the low shaft 56 to the case 22 via the intermediate shaft 54.

The intermediate spool is supported by forward bearing 220 and an aft bearing 230. In an exemplary embodiment, the forward bearing 220 is a bidirectional thrust bearing directly radially and axially supporting/grounding the intermediate spool via a support 240 extending to the front frame 154 (e.g., just aft of the support 174). Alternative embodiments might ground to an inter-compressor frame 242 between the compressor sections 42 and 44. An exemplary bearing 220 is a single stage bidirectional ball bearing.

A single bidirectional duplex bearing (e.g., two oppositely configured unidirectional ball or roller thrust stages) may also be used as the bearing 220 or other thrust bearing. The close positioning of the two stages may be needed to avoid problems associated with differential thermal expansion of the two bodies (spools or static structure between which the bearings radially intervene). With large gap between stages (e.g., measured as the longitudinal span between the ends of the rolling elements of the first stage and the adjacent ends of the rolling elements of the second stage) differential thermal expansion could either cause bearing disengagement or excessive thrust loads. A small gap (e.g., no more than the individual axial spans of the rolling elements of one or both stages, more broadly no more than 1.5 times twice such axial span) will avoid such problems. In an exemplary gas turbine engine, such a gap may be not more than 30 mm or not more than 25 mm. For example, the intermediate spool and high spool may be subject to greater heating than the case and thus greater thermal expansion. If one of these is supported relative to the case by two widely spaced thrust stages, differential thermal expansion may be a problem. In contrast, the fan shaft and the adjacent portion of the low spool may be at relatively uniform temperature and thus the two bearings 148 and 150 may be more widely spaced (shown not to scale so that the relative gap appears smaller than it would be in an actual engine).

The bearing 230 (e.g., a non-thrust bearing, such as a non-thrust roller bearing) indirectly radially supports/ grounds the intermediate spool by engaging the intermediate spool and the low spool or, namely, engaging the intermediate shaft 54 and the low shaft 56 with an outer race engaging the intermediate shaft 54 (e.g., aft of the turbine 28 and an inner race engaging the low shaft 56 (e.g., just ahead of the turbine 50).

The radial loads on the intermediate spool at the bearing 230 will primarily be transmitted to the low shaft 56 and through an aft portion of the low shaft 56 to the bearing 172 and grounded by the support 180 and frame 182. Axial (thrust) loads will pass through the bearing 220.

Thus, thrust loads on the low spool are transmitted via the shaft 56 through the bearing 200, through the portion of the intermediate shaft thereahead, to the bearing 220, and grounded back through the support 240.

The core spool may be fully directly supported by two bearings 250 and 260 of which at least one would be a thrust bearing. In the exemplary embodiment, the bearing 250 is a forward bearing grounding a forward portion of the core shaft ahead of the compressor section 44 to the intercompressor frame 242 via a support 270. The aft bearing 260 grounds a portion of the core shaft aft of the turbine section 46 via a support 272 to an inter-turbine frame 274 between the sections 46 and 48. In alternative embodiments, this aft bearing 260 might be shifted intermediate the compressor section 44 and turbine section 46 and the support 272 may extend to a combustor frame (not shown). In the exemplary implementation, the bearing 250 is a thrust bearing (e.g., a bidirectional ball bearing with its inner race engaging the core shaft 52 and its outer race engaging the support 270). The exemplary bearing 260 is a non-thrust bearing such as a straight roller bearing with its inner race engaging the core shaft 52 and its outer race engaging the support 272.

FIG. 1 further shows the FDGS 60 as having a centerplane 516 and the gears as having a gear width $W_G$ and the fan blade array as having a centerplane 518. From fore to aft, the bearings have respective centerplanes 520, 522, 524, 526, 528, 530, 532, 534, and 536.

Figure 2:
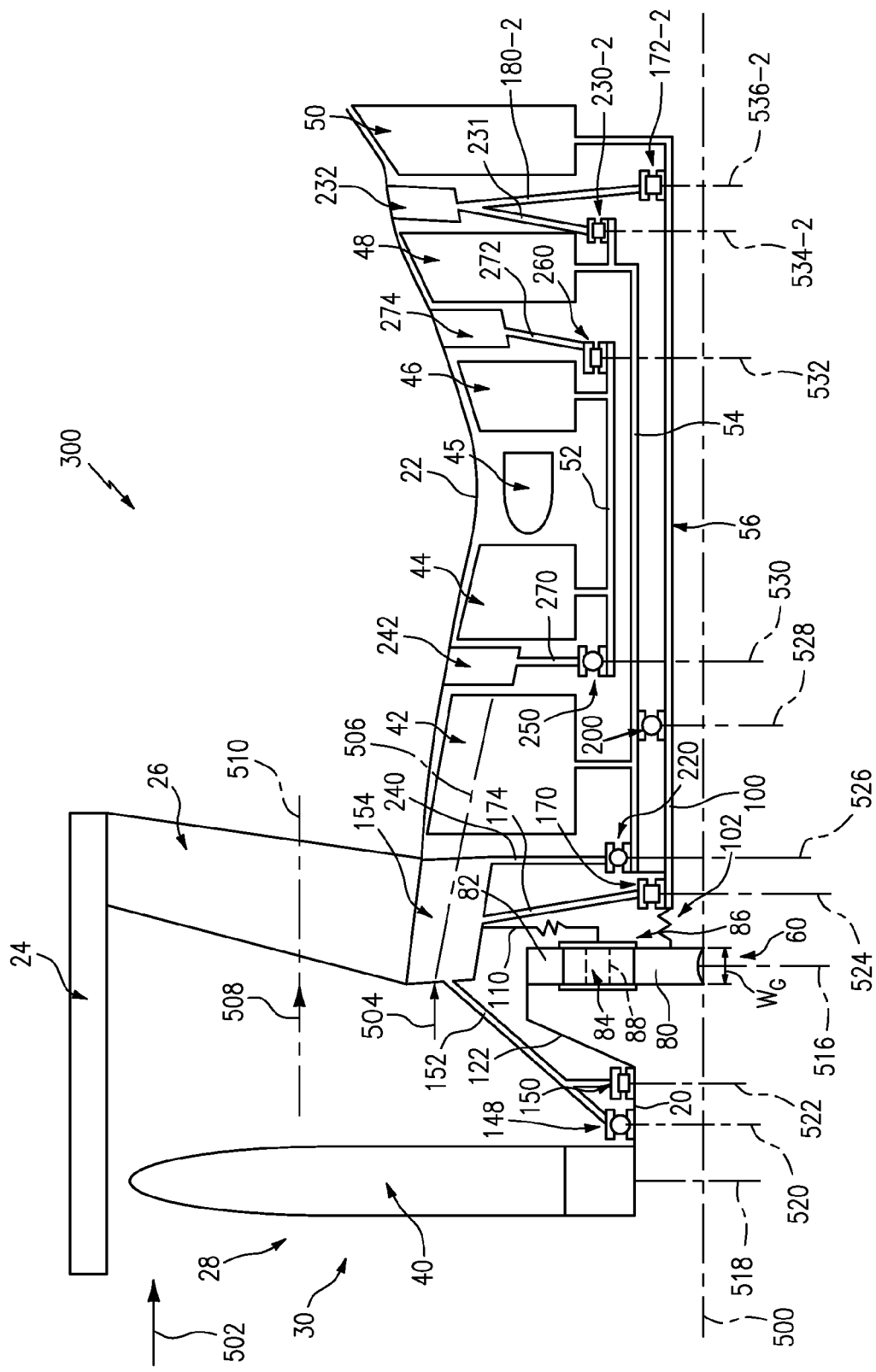
FIG. 2 is a schematic longitudinal sectional view of a second turbofan engine.

The FIG. 2 engine 300 is otherwise similar to engine 20, with two changes. First, intershaft non-thrust roller bearing 230 is replaced by a non-thrust roller bearing 230-2 grounding the intermediate shaft 54 directly to the case 22. In this example it grounds a portion of the shaft 54 aft of the turbine 48 to an inter-turbine frame 232 via support 231. Alternatives might involve grounding to inter-turbine frame 274 (e.g., FIG. 3 below). Second, non-thrust roller bearing 172 is replaced by a non-thrust roller bearing 172-2 ahead of the turbine 50 grounding the low shaft 56 directly to the case 22 via the frame 232 and a forwardly-shifted support 180-2.

Figure 3:
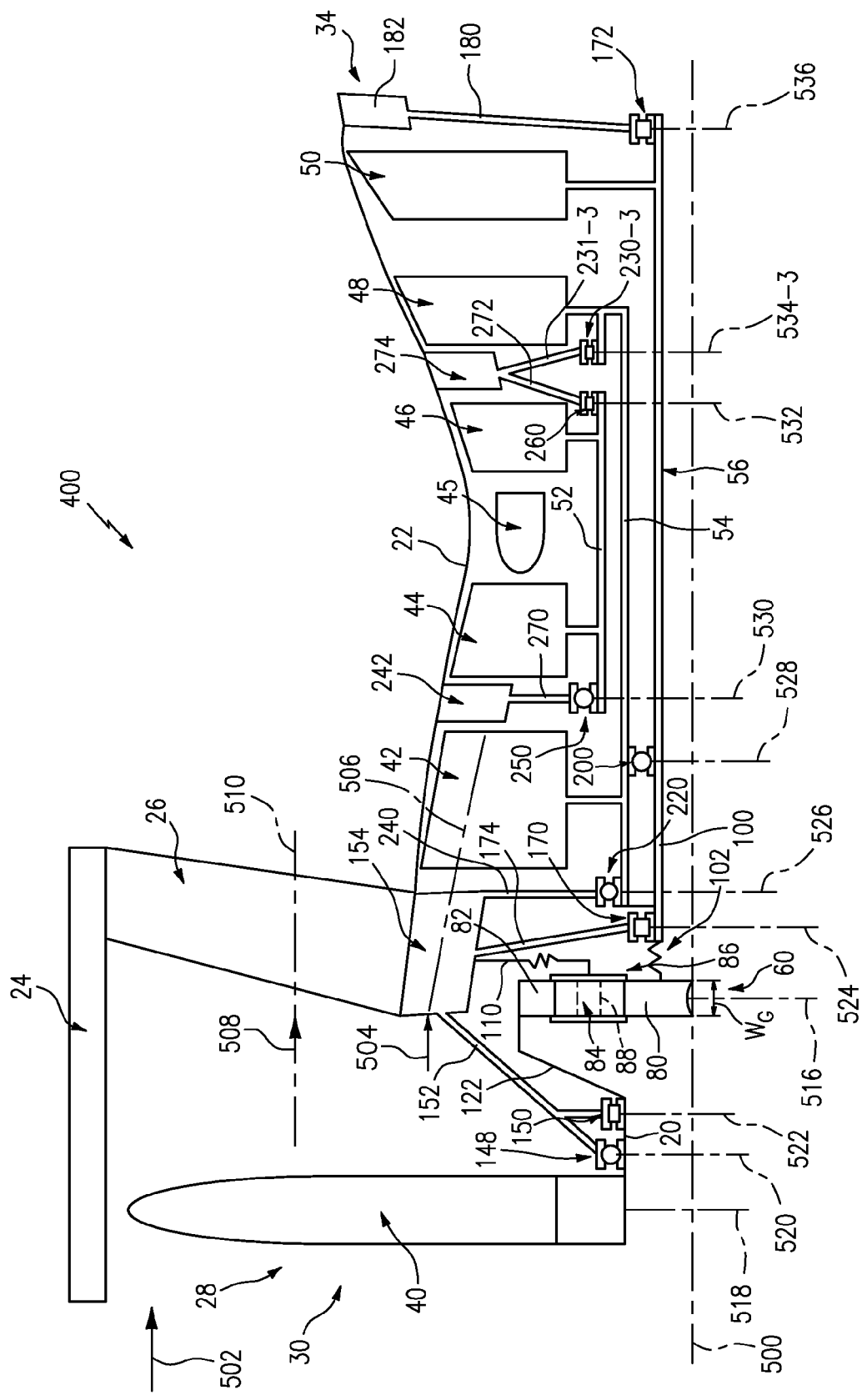
FIG. 3 is a schematic longitudinal sectional view of a third turbofan engine.

The FIG. 3 engine 400 is otherwise similar to engine 20, with one change. The intershaft non-thrust roller bearing 230 is replaced by a non-thrust roller bearing 230-3 grounding the intermediate shaft 54 directly to the case 22. In this example it grounds a portion of the intermediate shaft 54 forward of the turbine 48 to inter-turbine frame 274 via support 231-3.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing basic engine configuration, details of such configuration or its associated environment may influence details of particular implementations. Accordingly, other embodiments are within the scope of the following claims.

What is claimed is:

1. A turbofan engine (20) comprising:
   a fan (28);
   a fan drive gear system (60);
   a fan shaft (120) coupling the fan drive gear system to the fan;
   a low spool comprising:
     a low pressure turbine (50); and
     a low shaft (56) coupling the low pressure turbine to the fan drive gear system;
   an intermediate spool comprising:
     an intermediate pressure turbine (48); and
     a compressor (42);
   a core spool comprising:
     a high pressure turbine (46); and
     a compressor (44); and
   a plurality of main bearings,
   wherein:
     the low spool engages four of said main bearings, of which at least two are non-thrust bearings (170, 230, 172) and a single one is a thrust bearing (200);
     of said at least two non-thrust bearings engaged by the low spool, at least one is a non-thrust bearing (230) engaging the low spool and the intermediate spool;
     the fan shaft engages at least two of said main bearings (148, 150);
     the core spool engages at least two of said main bearings (250, 260); and
     the intermediate spool engages at least two of said main bearings (220, 200, 230).

2. The engine of claim 1, wherein:
   said thrust bearing is a non-duplex ball bearing.

3. The engine of claim 1, wherein:
   said non-thrust bearings and said thrust bearing are rolling element bearings.

4. The engine of claim 3, wherein:
   said non-thrust bearings are roller bearings; and
   said thrust bearing is a ball bearing.

5. The engine of claim 1, wherein:
   there are exactly nine said main bearings.

6. The engine of claim 5, wherein:
   each of said nine said main bearings is either a single stage rolling element bearing or a multi-stage bearing wherein an interstage gap is no more than 30 mm.

7. The engine of claim 5, wherein:
   of the at least two bearings that engage the core spool, at least one is a non-thrust bearing and at least one is a thrust bearing.

8. The engine of claim 5, wherein:
   of the at least two bearings that engage the intermediate spool, at least one is a non-thrust bearing and at least one is a thrust bearing.

9. The engine of claim 1, wherein:
   of the at least two bearings that engage the fan shaft, at least one is a non-thrust bearing and at least one is a thrust bearing.

10. The engine of claim 9, wherein:
    of the at least two bearings that engage the core spool, at least one is a non-thrust bearing and at least one is a thrust bearing.

11. The engine of claim 9, wherein:
    of the at least two bearings that engage the intermediate spool, at least one is a non-thrust bearing and at least one is a thrust bearing.

12. The engine of claim 1 wherein:
    one of said at least two non-thrust bearings engaging the low spool engages a turbine exhaust frame.

13. The engine of claim 1, wherein:
    one of the bearings engaging the fan shaft is a thrust bearing (148) and one the bearings engaging the fan shaft is a non-thrust bearing (150).

14. The engine of claim 1, wherein:
    one of the bearings engaging the core spool is a thrust bearing (250) and one the bearings engaging the core spool is a non-thrust bearing (260).

15. A turbofan engine (300; 400) comprising:
a fan (28);
a fan drive gear system (60);
a fan shaft (120) coupling the fan drive gear system to the fan;
a low spool comprising:
    a low pressure turbine (50); and
    a low shaft (56) coupling the low pressure turbine to the fan drive gear system;
an intermediate spool comprising:
    an intermediate pressure turbine (48); and
    a compressor (42);
a core spool comprising:
    a high pressure turbine (46); and
    a compressor (44); and
a plurality of main bearings,
wherein:
    there are exactly nine said main bearings;
    the low spool engages three of said main bearings, of which exactly two are non-thrust bearings (170, 230-2, 172-3; 170, 230-3, 172) and a single one is a thrust bearing (200);
    the fan shaft engages at least two of said main bearings (148, 150);
    the core spool engages at least two of said main bearings (250, 260);
    the intermediate spool engages at least two of said main bearings (220, 200, 230-2; 200, 220, 230-3); and
    said one thrust bearing engaging the low spool also engages the intermediate shaft.

16. The engine of claim 15, wherein:
said two non-thrust bearings engaging the low spool also engage a case (22).

17. The engine of claim 15 wherein:
one of said at least two non-thrust bearings engaging the low spool engages an inter-turbine frame.

18. A turbofan engine (300; 400) comprising:
a fan (28);
a fan drive gear system (60);
a fan shaft (120) coupling the fan drive gear system to the fan;
a low spool comprising:
    a low pressure turbine (50); and
    a low shaft (56) coupling the low pressure turbine to the fan drive gear system;
an intermediate spool comprising:
    an intermediate pressure turbine (48); and
    a compressor (42);
a core spool comprising:
    a high pressure turbine (46); and
    a compressor (44); and
a plurality of main bearings,
wherein:
    there are exactly nine said main bearings;
    the low spool engages at least three of said main bearings, of which at least two are non-thrust bearings (170, 230-2, 172-3; 170, 230-3, 172) and a single one is a thrust bearing (200);
    the fan shaft engages at least two of said main bearings (148, 150);
    the core spool engages at least two of said main bearings (250, 260);
    the intermediate spool engages at least two of said main bearings (220, 200, 230-2; 200, 220, 230-3); and
    of the at least two bearings that engage the fan shaft, at least one is a non-thrust bearing and at least one is a thrust bearing.

19. The engine of claim 18 wherein:
one of said at least two non-thrust bearings engaging the low spool engages an inter-turbine frame.

20. The engine of claim 18 wherein:
one of said at least two of said main bearings engaging the intermediate spool is a non-thrust bearing engaging an inter-turbine frame.

\* \* \* \* \*